June 13, 1933.  E. R. EKSTROM  1,913,537
ASSEMBLING FIXTURE
Filed March 14, 1931  2 Sheets-Sheet 1
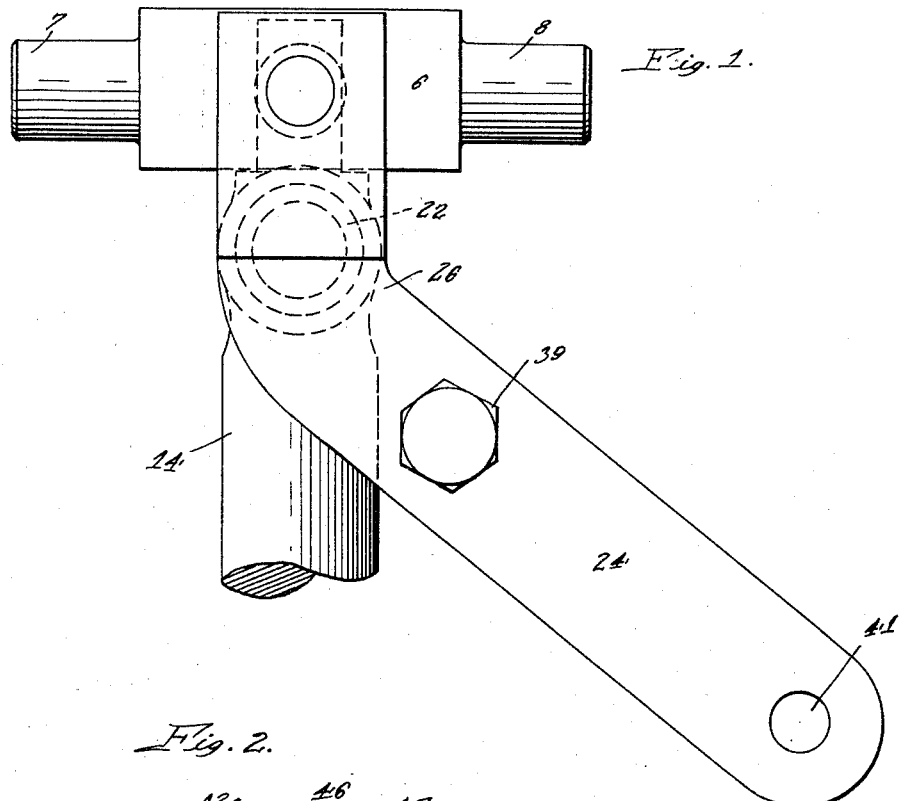
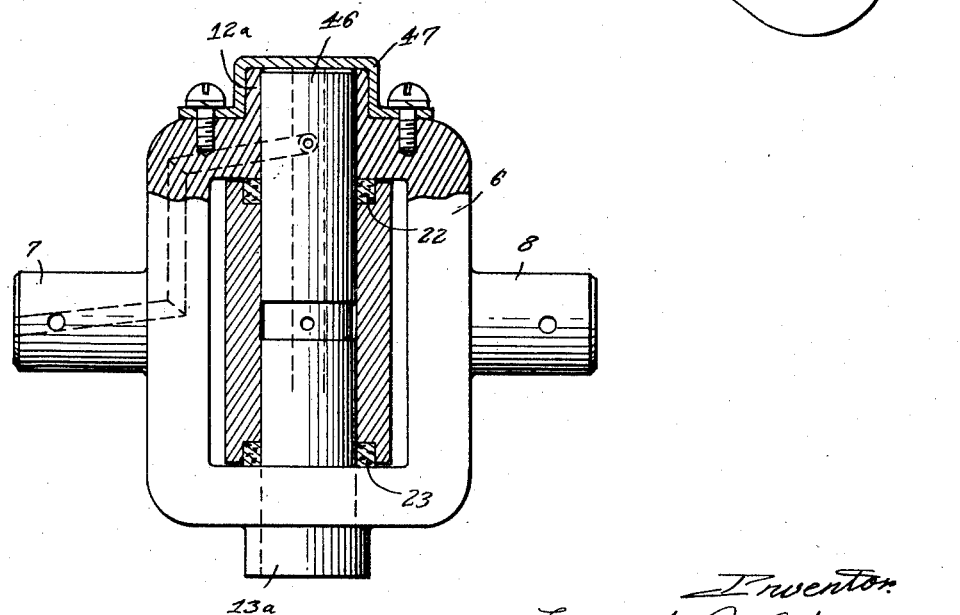

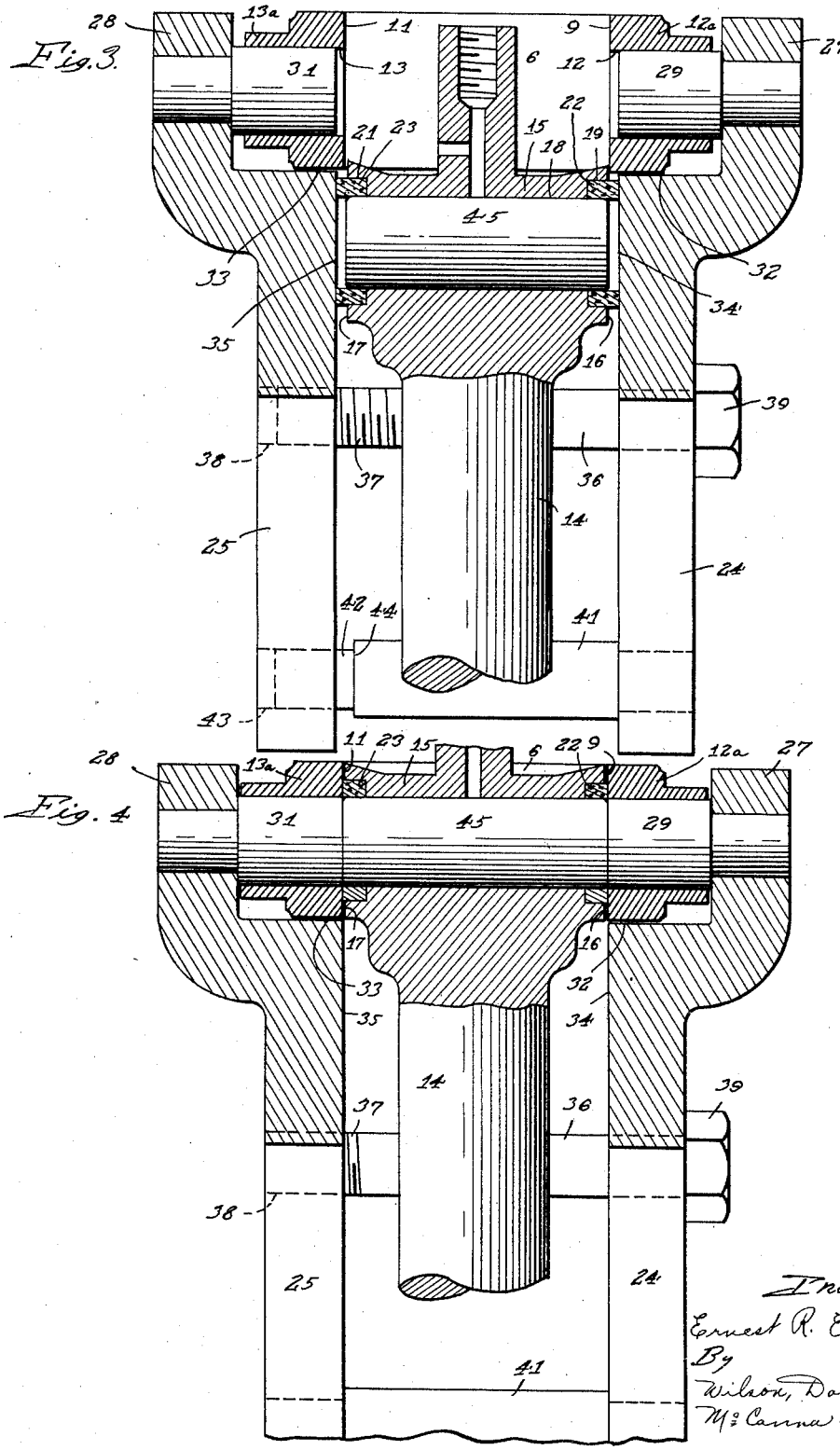

Patented June 13, 1933

1,913,537

UNITED STATES PATENT OFFICE

ERNEST R. EKSTROM, OF ROCKFORD, ILLINOIS, ASSIGNOR TO MECHANICS UNIVERSAL JOINT COMPANY, OF ROCKFORD, ILLINOIS, A CORPORATION OF ILLINOIS

ASSEMBLING FIXTURE

Application filed March 14, 1931. Serial No. 522,688.

This invention relates to assembling fixtures for assembling parts having abutting faces and itnermediate compressed gaskets, by sliding the faces laterally into position and is particularly adapted for use in assembling universal joints such as described in the application of Carl E. Swenson, Serial No. 385,844, filed October 14, 1929.

In assembling a universal joint such as that described in the aforesaid application, it is necessary to move either the yoke member or the transmission ring into position with respect to the other member and simultaneously hold the gaskets in their compressed position. It is also necessary to prevent the gaskets from expanding into the bore of the yoke member during the compression of the former in order that the cross-pin may be subsequently inserted without damaging the gaskets.

One of the objects of my invention is the provision of an assembling fixture wherein one of the parts to be assembled is secured and which is provided with means for compressing the intermediate gasket and holding the gasket in its compressed position while the second part is being moved into alignment with the first part.

Another object of the invention is the provision of an assembling fixture having means for preventing the gasket from expanding into the bore of the part.

Other objects and attendant advantages will become apparent to those skilled in the art from the following description and the accompanying drawings in which—

Figure 1 is a side elevation showing one arm of the assembling fixture and the yoke member and transmission ring in position for the assembling operation;

Figure 2 is a face view of the transmission member partly in section, showing the yoke member and cross-pin in their assembled position;

Fig. 3 is a section through the assembling fixture, the transmission ring, and the yoke member, showing the parts in their relative positions for the first step of the assembling operation; and Fig. 4 is a section similar to Fig. 3 showing the relative position of the parts after the yoke member and transmission ring have been brought into alignment.

Since the joint itself forms no part of the present invention, it will be sufficient for this disclosure to give but a single assembly of parts adapted to be assembled by means of the fixture. The transmission ring consists of a rectangular portion designated generally by the numeral 6 having a pair of trunnions 7 and 8 adapted to cooperate with other portions of the joint as described in the aforesaid application. The ring is further provided with internal oppositely spaced bearing faces 9 and 11 which are provided with bores 12 and 13 adapted to provide trunnion bearings 12a and 13a.

The yoke member 14 is provided with a yoke portion 15 having bearing faces 16 and 17 at opposite ends thereof. A bore 18 passes through the yoke from face to face. Counter bores 19 and 21 serve to receive compressible gaskets 22 and 23. In assembling the joint the yoke 15 is moved laterally into the center of the ring 6, the faces 16 and 17 of the yoke member passing along the faces 9 and 11 of the transmission ring during this movement. In order to accomplish this the gaskets 22 and 23 must be compressed so that they rest almost wholly within the counter-bores 19 and 21.

In order to accomplish this assembly I have provided an assembly fixture having a pair of spaced arms 24 and 25, each having substantially the shape shown in Fig. 1. It will be seen that the arms pass through an angle at 26, intermediate their ends so that means may be provided for interconnecting the two arms without interferring with the position or movement of the yoke member 14. The forward ends of the arms 24 and 25 are provided with offset ears 27 and 28 adapted to fixedly support opposed trunnions 29 and 31 and provide shoulders 32 and 33. The trunnions 29 and 31 and the shoulders 32 and 33 are adapted to cooperate in fixedly holding the transmission ring 6 during the assembling operations. The trunnions 29 and 31 are inserted in the bores 12 and 13 of the transmission ring, and are adapted to snugly fit therein but to have free axial movement therein. The distance between the shoulders 32 and 33 and the trunnions 29 and 31, is such as to closely receive the transmission ring 6, thereby preventing rotary movement of the ring on the trunnions 29 and 31.

The shoulders 32 and 33 also cooperate in forming gasket compressing faces 34 and 35 on the arms 24 and 25, and result in the forward edges of these faces lying in very close proximity to the rearward edges of the faces 9 and 11. The gasket compressing faces 34 and 35 are normally adapted to rest in parallel relation with the faces 16 and 17 of the yoke member and are adapted to be brought into contact with the gaskets 22 and 23 positioned in the counterbores 19 and 21. Means are provided for drawing the arms 24 and 25 together, thereby bringing the gasket compressing faces 34 and 35 into contact with the faces 16 and 17 whereby the gaskets 22 and 23 are compressed substantially wholly within the counterbores 19 and 21. This means consists of a bolt 36 passing through the arm 24 and having a threaded end 37 engaging a threaded opening 38 in the arm 25. The bolt 36 is provided with a hexagonal head 39 adapted to be turned by means of a wrench or the like. Rotation of the head 39 will draw the arms 24 and 25 together or separate them, according to the direction of rotation. A guide pin 41 is fixedly secured in the arm 24, the free end 42 thereof having slidable movement in an opening 43 in the arm 25. A shoulder 44 on the pin 41 serves to limit the inward movement of the lower ends of the arms 24 and 25.

In order to prevent the bushings 22 and 23 from expanding into the bore 18 when the arms 24 and 25 are brought together, an alignment pin 45 of the same length as the bore 18 and of substantially the same diameter is inserted in the bore. The pin 45 provides inner faces against which the gaskets may be compressed, thereby avoiding expansion of the latter into the bore 18.

In using the fixture the arms 24 and 25 which will at this point be separate units, because of the removal of the bolt 36, will be positioned with the trunnions 29 and 31 in the bores 12 and 13 of the transmission ring 6. The pin 41 will then be inserted in the opening 43 to align the two arms 24 and 25 of the fixture. The bolt 36 will then be inserted through the arm 24 and caused to engage the threads in the hole 38 of the arm 25. The fixture is then ready to receive the yoke member 14 in which the alignment pin 45 and the gaskets 22 and 23 have been positioned. The yoke member 14 will be positioned with the gaskets between the gasket compressing faces 34 and 35. At this point the bolt 36 will be rotated, drawing the arms 24 and 25 together until the faces 34 and 35 thereof contact with the faces 16 and 17 of the yoke member 14. The parts are then in a position in which manual relative movement between the transmission ring 6 and the yoke member 14 may bring the bore 18 and the bores 12 and 13 into axial alignment. It will be seen that during this movement the gasket compressing faces 34 and 35 will maintain the gaskets compressed so that the faces 16 and 17 of the yoke member and the faces 9 and 11 of the ring member may be moved parallel with respect to each other from the position shown in Fig. 3 into the position shown in Fig. 4, the gasket compressing faces 34 and 35 being substantially coplanar with the faces 9 and 11 of the ring 6. Thus the faces 34 and 35 maintain the gaskets compressed until the latter move into contact with the faces 9 and 11.

The inner position of the arms 24 and 25 is determined by contact of the ears 27 and 28 against the ring 6 and by contact of the arm 25 against the shoulder 44 on the pin 41, thereby preventing possible excessive pressure of the arms against the faces 16 and 17 of the yoke member 14.

It will be seen that the movement between the ring 6 and the yoke member 14 may be brought about by movement of either of these members. That is, the yoke member may be secured against movement and the transmission ring 6, together with the fixture, given the desired movement or the transmission ring and fixture may be secured against movement and the yoke member 14 given the desired movement.

When the parts have been brought into the relative positions shown in Fig. 4, the bolt 36 is removed and the trunnions 29 and 31 slipped out of the bores 12 and 13. The alignment pin 45 may then be removed from the bore 18 by any suitable or desired means and a cross-pin 46 inserted in the bores 12, 13 and 18, the cross-pin 46 being that normally employed in the joint as shown in Fig. 2. At this point the caps 47 are positioned over the ends of the bores 12 and 13 enclosing the ends of the cross-pin 46 and the joint assembled in the usual and customary manner.

It will be seen that I have provided a simple, rapid and convenient means for assembling parts of this general description wherein it is necessary to move parts having abutting faces and intermediate compressed gaskets laterally into alignment.

While I have thus described and illustrated a specific embodiment of my invention I am aware that numerous alterations and changes may be made therein without materially departing from the spirit of the invention or the scope of the appended claims in which—

I claim:

1. An assembly fixture for assembling parts having abutting faces and an intermediate compressed gasket, by sliding said parts laterally into position, comprising means for holding one of said parts, means for compressing said gasket in place against the other one of said parts and for bringing said faces into coplanar relationship, and means for holding the gasket and maintaining said faces in such relationship during manual movement of the parts into position.

2. An assembly fixture for assembling parts having abutting faces and coaxial bores with a compressed gasket around one of said bores between said faces, by sliding said parts laterally into position comprising, means for holding one of said parts, said means having means for positioning the second part with said faces in coplanar relationship and for compressing said gasket against one of the faces, for the manual movement of said parts into axial alignment, and means for preventing said gasket from expanding under pressure into one of said bores.

3. A fixture for assembling a universal joint having a transmission member provided with spaced coaxial bearing portions, a yoke member, a cross-pin through said bearing portion and said yoke member, and a compressed gasket between said yoke member and at least one of said bearing portions comprising, spaced arms, means on said arms for holding said transmission member, and means on said arms for compressing said gaskets and guiding said yoke member, whereby the latter may be moved laterally into coaxial alignment with said bearing portions.

4. A fixture for assembling abutting coaxial bearing members having an intermediate compressed cork gasket comprising a member having means receivable in one of said members for holding the same, and means for compressing said gasket against the abutting face of the second member, and means coplanar with the face of the first member for guiding said second member and said gasket for manual movement laterally into coaxial alignment with the first member.

5. A fixture for assembling a universal joint having abutting coaxial bearing members, bores in said bearing members, and intermediate compressed gaskets, comprising spaced arms, trunnions on said arms receivable in one of said members, means for preventing rotation of said last mentioned member, faces on said arms arranged to bear against said gaskets, means for drawing said arms together to cause said faces to compress said gaskets while said parts are manually moved into alignment, and means for preventing said gaskets from expanding into said bore while being compressed.

6. A fixture for assembling two parts having abutting coaxial faces and an intermediate compressed gasket of a shape such that the two parts must be assembled by lateral movement of one face across the other, comprising means for holding one of said parts, means for compressing said gasket against the second of said parts, and means for positioning the two parts with the said faces in coplanar relationship and for maintaining such relationship during the manual movement of the second part into axial alignment with the first part.

7. A fixture for assembling two parts having coaxial bores, abutting coaxial faces and an intermediate compressed gasket of a shape such that the two parts must be assembled by lateral movement of one face across the other, comprising means for holding one of said parts, means for compressing said gasket against the second of said parts, and means for positioning the two parts with the said faces in coplanar relationship and for maintaining such relationship during the movement of the second part into axial alignment with the first, and means within said bore for preventing the gasket from expanding into the bore while under compression.

In witness of the foregoing I affix my signature.

ERNEST R. EKSTROM.